L. PROCKER.
COMBINATION FAUCET AND FILTER.
APPLICATION FILED MAY 25, 1916.
1,212,104.
Patented Jan. 9, 1917.
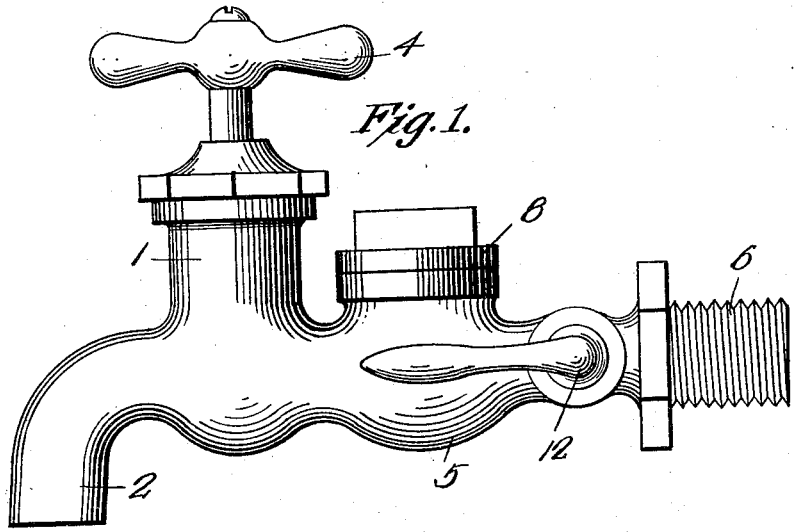
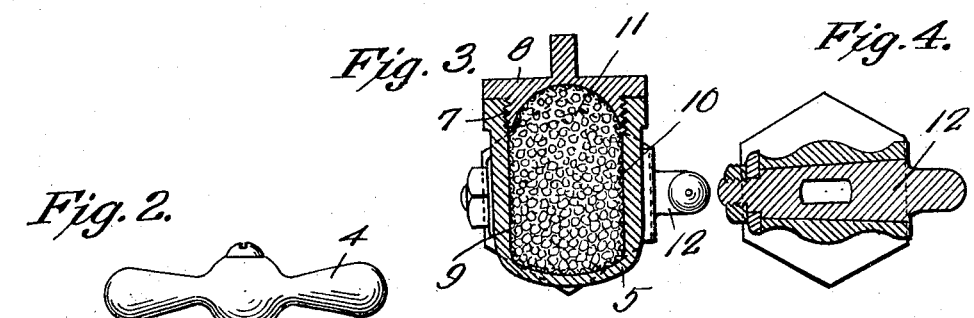
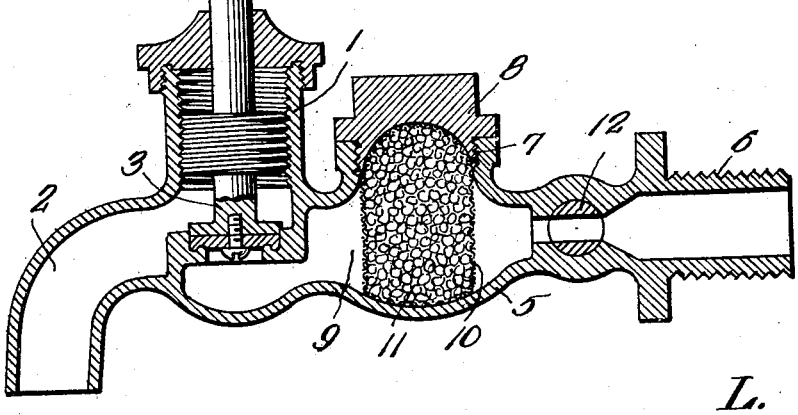
Witnesses
James F. Crown,
Inventor
L. Procker,
By
Attorneys

UNITED STATES PATENT OFFICE.

LEOPOLD PROCKER, OF NEW YORK, N. Y.

COMBINATION FAUCET AND FILTER.

1,212,104.  Specification of Letters Patent.  Patented Jan. 9, 1917.

Application filed May 25, 1916. Serial No. 99,809.

*To all whom it may concern:*

Be it known that I, LEOPOLD PROCKER, a citizen of Austria-Hungary, residing at New York, in the county of New York, State of New York, have invented certain new and useful Improvements in Combination Faucets and Filters; and I do hereby declare the following to be a full, clear, and exact description of the invention, such as will enable others skilled in the art to which it appertains to make and use the same.

This invention relates to a combination faucet and filter.

An object of the invention resides in the provision of a device of this character in which the filter is so mounted that it may readily be removed and cleaned and in which a valve is provided so as to stop the flow of water during the cleaning operation.

A still further object of the invention resides in the provision of a device which is exceedingly simple in construction and one wherein a very simple filter is provided which may be readily cleaned.

With these and other objects in view, such as will appear as my description progresses, my invention comprises the combination and arrangement of parts as set forth in and falling within the scope of the appended claim.

In the drawing: Figure 1 is an elevational view of a device constructed in accordance with my invention; Fig. 2 is a vertical longitudinal sectional view; Fig. 3 is a transverse sectional view taken through the filter, and Fig. 4 is a similar view taken through the valve.

The embodiment of the invention illustrated in the drawing comprises a casing 1 which is provided with a discharge spout 2. The ordinary reciprocating valve 3 is mounted in the casing 1 and operated by a handle 4. The casing 1 is provided with an extension 5 which is provided with a screw threaded shank 6 adapted for attachment to a water pipe. The extension 5 of the casing is provided with an opening 7 at its upper side which is closed by a removable cap 8. Located in a chamber 9 in this extension 5 is a filter which is composed of a screen cylinder 10 filled with a suitable filtering substance 11 such as gravel. This filtering device is retained in place by the cap 8 but may be removed bodily upon the removal of the cap. A stop cock or valve 12 is mounted in the extension 5 between the filter and the shank 6 so that when the cap 8 is removed together with the filtering device the flow of water to the faucet may be prevented.

It will be seen that I have provided a device which includes a faucet and a filter and I have so arranged the filter with relation to the faucet that the water will be filtered before leaving the faucet. Furthermore I have mounted the filter in such manner that it may readily be removed for cleaning and I have provided means for preventing the flow of water from the supply pipe to the faucet when the filter is removed.

While I have illustrated and described a particular embodiment of my invention, it has merely been for the sake of convenience and I do not wish to be limited to that particular embodiment of the invention as it is obvious that numerous changes may be made in the details of construction without departing from the spirit of the invention or exceeding the scope of the appended claim.

What I claim is:—

In a combination faucet and filter, the combination with a faucet casing and spout of a reciprocating valve mounted in the former, an extension on the casing having an opening in the upper side thereof and a chamber located beneath the opening, a filter including a screen cylinder having a filtering material therein removably mounted in the chamber, a cap for closing the opening in the extension of the casing and having a portion extending into said opening and engaging the upper end of the filter so that it may force the filter into the chamber and fill the latter, the said filter being out of alinement with the line of motion of the aforementioned reciprocating valve.

In testimony whereof, I affix my signature, in the presence of two witnesses.

LEOPOLD PROCKER.

Witnesses:
 FRED. KABLITZ,
 WM. BREHN.

Copies of this patent may be obtained for five cents each, by addressing the "Commissioner of Patents, Washington, D. C."